(12) United States Patent
Berland

(10) Patent No.: US 7,816,605 B2
(45) Date of Patent: Oct. 19, 2010

(54) SEISMIC CABLE CONNECTION DEVICE

(75) Inventor: Norvald Berland, Fyllingsdalen (NO)

(73) Assignee: Bennex AS, Bergen (NO)

( * ) Notice: Subject to any disclaimer, the term of this patent is extended or adjusted under 35 U.S.C. 154(b) by 347 days.

(21) Appl. No.: 12/119,516

(22) Filed: May 13, 2008

(65) Prior Publication Data

US 2009/0286413 A1 Nov. 19, 2009

(51) Int. Cl.
*H01R 4/00* (2006.01)
(52) U.S. Cl. .................. 174/84 R; 174/86; 174/88 R
(58) Field of Classification Search ........... 174/74 R, 174/78, 84 R, 88 R, 70 S; 367/122
See application file for complete search history.

(56) References Cited

U.S. PATENT DOCUMENTS

| | | | | |
|---|---|---|---|---|
| 2,738,488 A | * | 3/1956 | MacKnight | .......... 367/16 |
| 3,329,764 A | * | 7/1967 | Tanges, Jr. | .......... 174/74 R |
| 4,427,033 A | | 1/1984 | Ege | |
| 4,479,690 A | * | 10/1984 | Inouye et al. | .......... 439/275 |
| 4,673,231 A | * | 6/1987 | McAnulty, Sr. | .......... 439/587 |
| 5,214,243 A | | 5/1993 | Johnsom | |
| 6,292,431 B1 | * | 9/2001 | Talamo | .......... 367/20 |
| 6,708,640 B1 | * | 3/2004 | Williams | .......... 114/249 |

FOREIGN PATENT DOCUMENTS

| | | |
|---|---|---|
| DE | 4121058 | 10/1992 |
| DE | 2497217 | 2/2005 |

\* cited by examiner

*Primary Examiner*—Willam H Mayo, III
(74) *Attorney, Agent, or Firm*—Christian D. Abel

(57) ABSTRACT

A connection device for cables having an elongated, cylindrical body with first and second ends, a termination interface member attached to each end of the elongated cylindrical body, wherein the elongated, cylindrical body is made of a flexible, cylindrical substrate member extending between the termination interfaces, with a plurality of elongated tension members helically wound about the exterior of the flexible substrate member, the ends of the tension members being attached to respective termination interface members.

14 Claims, 7 Drawing Sheets

SEISMIC CABLE CONNECTION DEVICE

FIELD OF THE INVENTION

The invention relates to cables, and according to one aspect of the invention to seismic cables.

BACKGROUND OF THE INVENTION

In a variety of applications, an electrical cable must be towed or otherwise subjected to a pulling force. In such situations, it is desirable that the pulling force not be transmitted to the electrical wires or connection points. One such application is underwater seismic cables. In order to accommodate the pulling forces, which can be quite great, such cables are traditionally sheathed in an armouring layer comprising high tensile strength wires or the like integrated into the armouring. This armouring layer takes up the pulling forces, thus protecting the electrical wires from damage. The armouring layer also protects the electrical wires from damage due to abrasion against the seafloor while the cable is towed/deployed.

A seismic cable is, however, comprised of several modules housing electronic measuring apparatus joined in series by segments of the above-described, reinforced electrical cable. The cable segments have plugs at their ends, which are plugged into each end of the modules. This permits, among other things, intermediate modules in the series to be unplugged and replaced as needed. As can be appreciated, it is undesirable for the plug connection themselves to be subjected to the pulling forces. In order to prevent this, a transitional sleeve device may be bolted at its first end to the module, with its second end being connected to a coupling that is securely affixed to the reinforced armour of the cable. Since the pulling forces are transmitted from the module, via the sleeve, to the insulation layer, a slightly longer segment of exposed cable passing inside the sleeve and plugged into the module will not be subject to pulling forces. Because seismic cables are typically wound up and/or deployed from drums turned by winches onboard the seismic vessel, the sleeves must be flexible enough to negotiate the turn of the drum, as well as being resilient and durable enough to withstand to very great pulling forces and the harsh underwater environment. As a result, prior art transition devices have been large, cumbersome, complicated to assemble, and expensive, as well as having other disadvantages known to those skilled in the art. There is a need therefore, for an improved transitional device for connecting segments of seismic cable to intermediate sensor modules that can tolerate the unique and harsh environment where seismic cables are utilized.

DETAILED DESCRIPTION OF THE INVENTION

Figure 1:
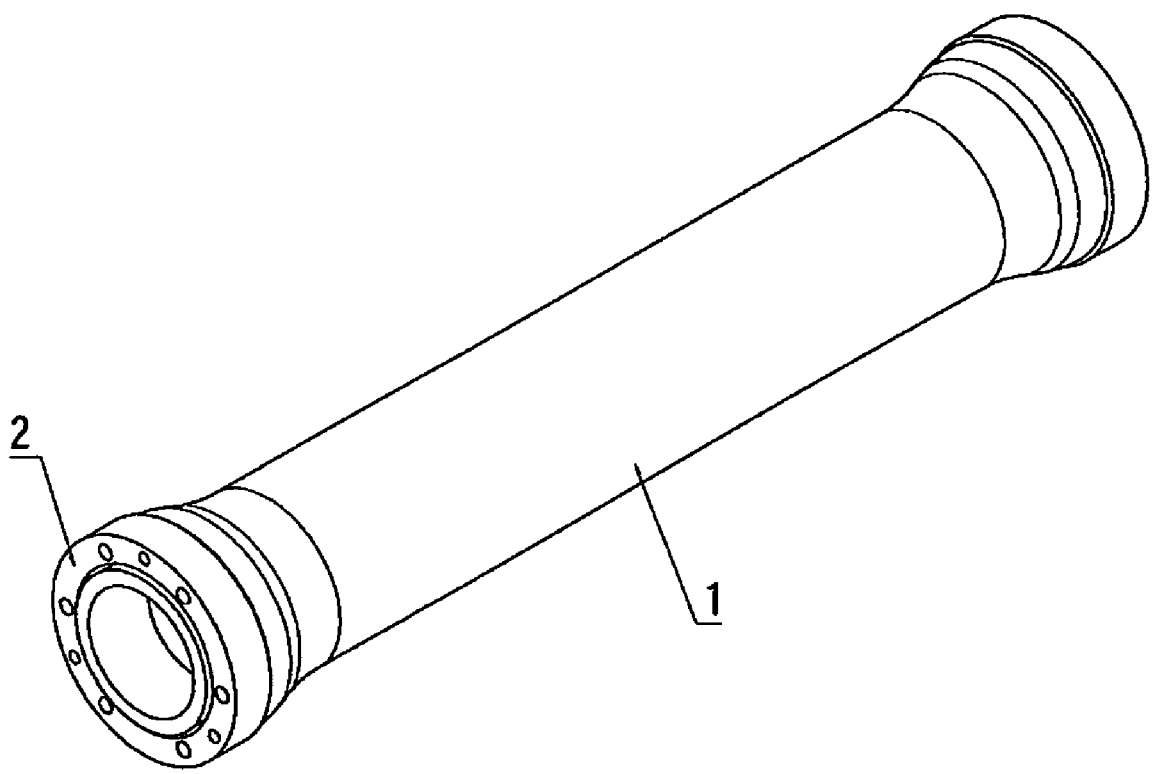
FIG. 1 is a perspective view of a preferred embodiment of the invention.
Figure 2:
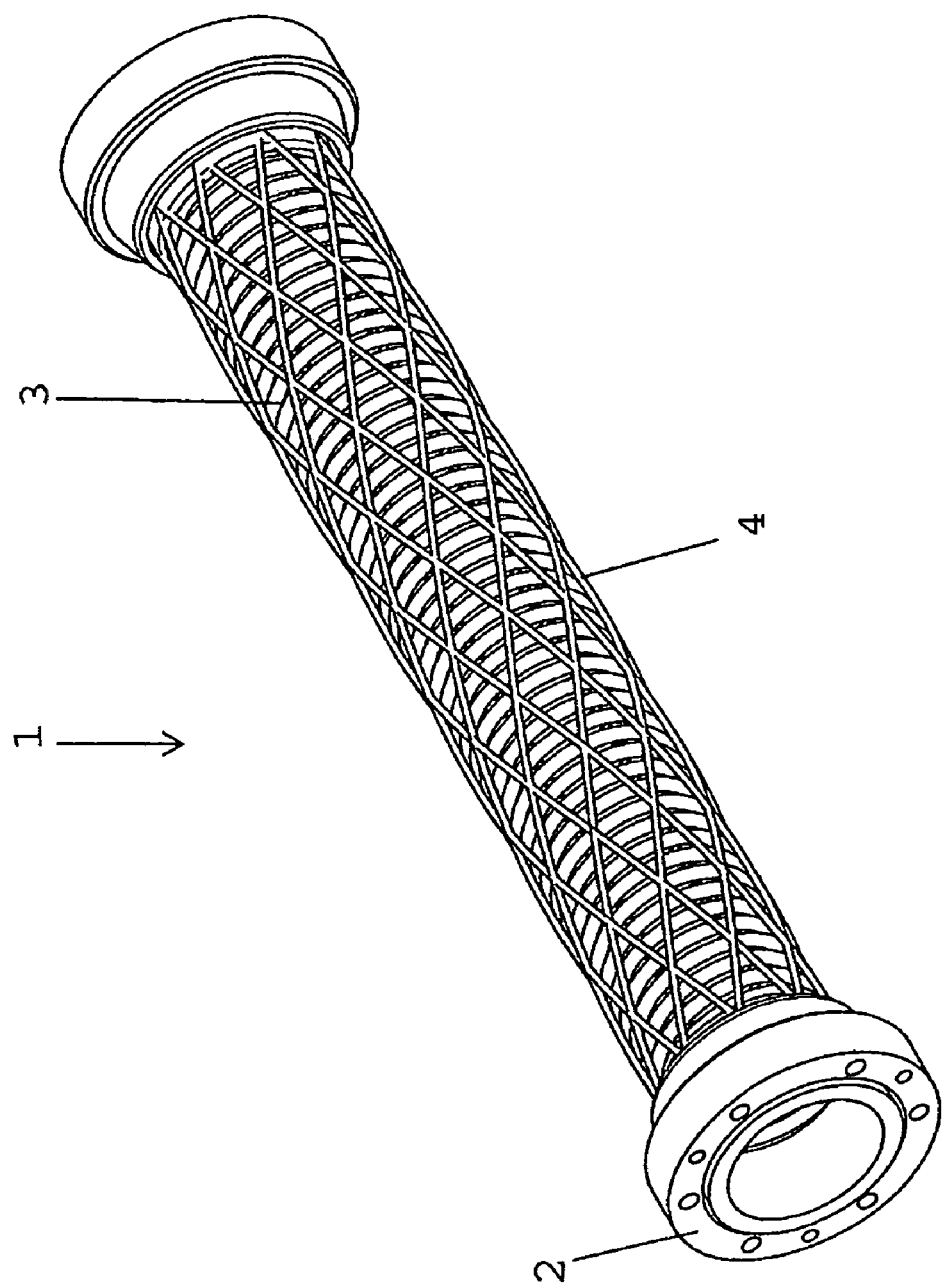
FIG. 2 is a perspective view showing the internal structure of the embodiment from FIG. 1.
Figure 3:
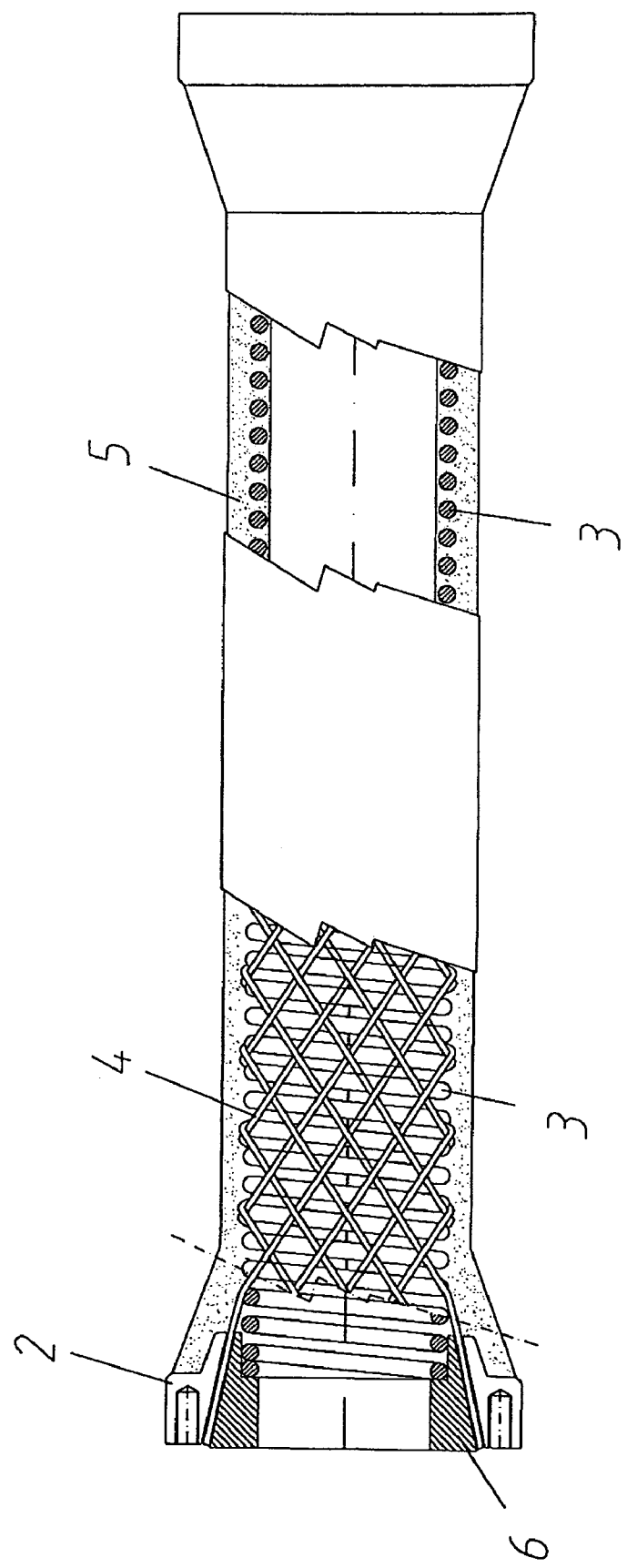
FIG. 3 is an cross sectional elevational view of the embodiment from FIG. 1.

As shown in FIG. 1, the device according to the invention comprises a flexible yet robust cylindrical body 1 having a termination interface 2 located at each end. The cylindrical body comprises, as shown in FIGS. 2 and 3, a helical spring 3 about which is woven a plurality of helically-wrapped wires 4. Spring 3 and wires 4 are encased in an outer sheath 5 of flexible, resilient material such as vulcanized rubber. Wires 4 are held in place at termination interfaces 2 by conical wedges 6. As shown in FIG. 3, the ends of spring 3 abuts the conical wedges. As explained below, spring 3 is slightly compressed, such that it exerts a relatively small outward pressure against the wedges in order to reduce any potential slack in the woven wires. Wedges 6 are pressed in place under high pressure. The conical shape of the wedge in combination with the friction between the wires and the wedges cause the wedges to be self-locking when the device is subjected to pulling forces under use.

According to one aspect of the invention, the device is constructed by compressing spring 2 in a suitable device such as a hydraulic press. A plurality of wires 4 are thereafter woven around the outside of the spring. Half of the wires are wound helically in a first direction, and the other half wound helically in the other direction. According to one aspect of the invention the wires negotiate at least one complete turn around the spring from end to end. Depending upon the length of the device, the angle of inclination of the wires will be between 20-40 degrees. In a preferred embodiment for use with seismic cables intended for use on the seafloor will approximately 40 wires having an angle of approximately 35 degrees be woven about spring 3. The wires will preferably have an outer diameter of approximately 0.6 mm with a breaking strength of around 25 tons and be constructed of steel such as SS316. After the wires are woven, their free ends are locked in place at the termination interfaces by conical wedges 6 which are wedged into place under great force. The compression on the spring is thereafter released, which helps to remove any slack from the wires. Afterwards, the spring/wire arrangement is preferably encased in a flexible, resilient and durable outer sheath of, for example, vulcanized rubber.

When the device according to the invention is subjected to a pulling force, the force is taken up by wires 4. The function of the spring is primarily to provide a non-collapsible substrate for the wires. Because of the weaving pattern of the wires, they are pulled tighter against the spring when subjected to a pulling forces, and are subjected to asymmetrical stretching and collapsing when subjected to a bending force. The spring therefore causes the device to maintain its circular cross section under bending, pulling or twisting. According to one aspect of the invention, therefore, the free angle of spring 3 (that is, the angular relationship between the arms of the spring when not under load) as well as the material and diameter of the spring material, is chosen so that it will not collapse under the expected forces of the intended application. The spring also serves as an internal reinforcement of the resilient outer sheath, giving the sheath added strength and durability.

Figure 4:
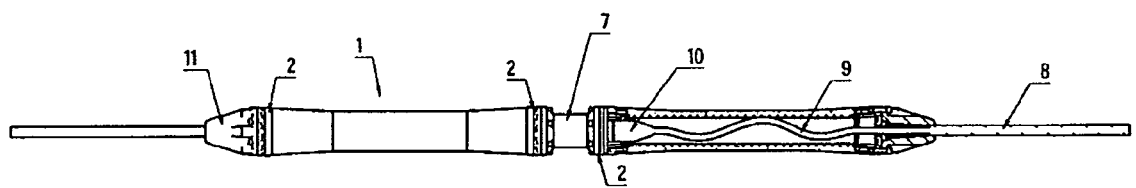
FIG. 4 is an elevational view showing two devices as depicted in FIG. 1 connected to an intermediate sensor module, and to lengths of cable.
Figure 6:
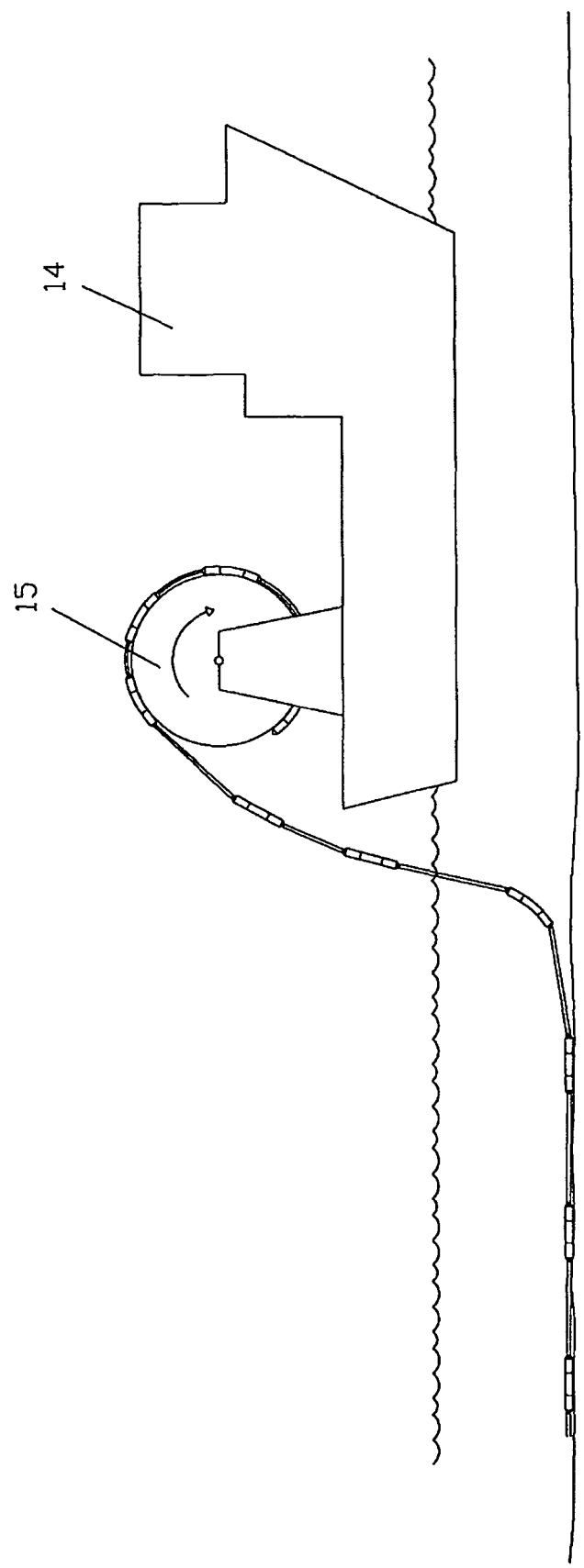
FIG. 6 is an illustration of a seismic vessel deploying a seismic cable comprising several of the devices according to the invention.

The device according to one aspect of the invention is used in a seismic cable arrangement as depicted in FIGS. 4 and 6. Such an arrangement comprises a series of sensor modules 7 connected to a signal-carrying cable, said cable comprising an outer wire-armoured layer 8 surrounding an electrical cable 9. Electrical cable 9 is connected to sensor module 7 by a plug 10.

Figure 7:
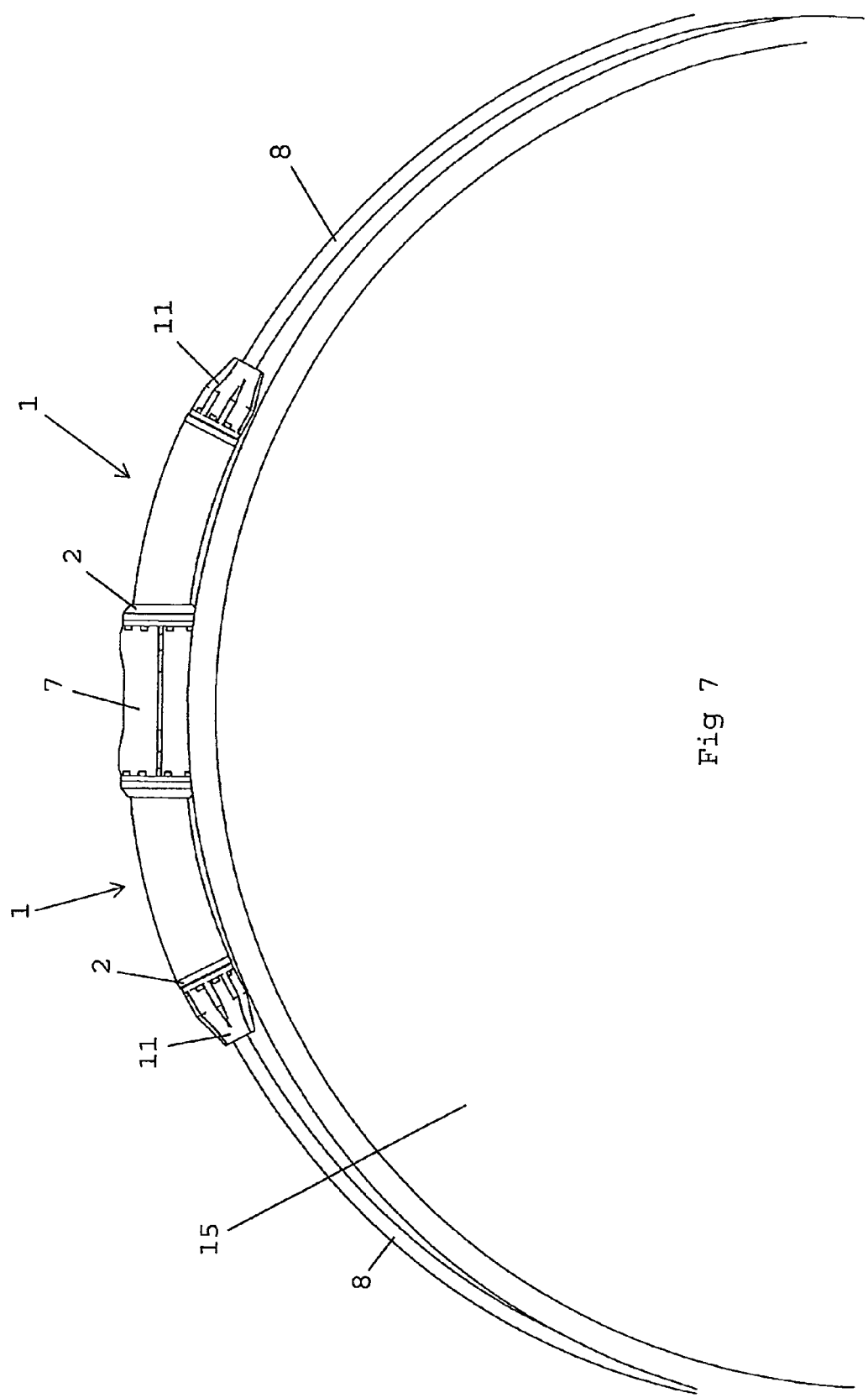
FIG. 7 is an elevation view of two devices according to the invention connected to an intermediate sensor module, and being wound upon the drum winch from FIG. 6.

Such an arrangement is subjected to great pulling forces under deployment and retrieval, as well as being subjected to bending forces when stores on a drum winch on the deployment vessel as shown in FIG. 7. The device according to the invention serves to transfer the pulling forces from the reinforces insulation layer 8, via wires 4, to the module 7. As shown in FIG. 4, an exposed length of electrical cable 9 is disposed and protected within cylindrical body 1. As can be appreciated, this length of electrical cable is not subjected to the pulling or bending forces. In such an arrangement the interior of the device is filled with water. In another aspect of the invention a hydrophone may be in the interior of the device.

Figure 5:
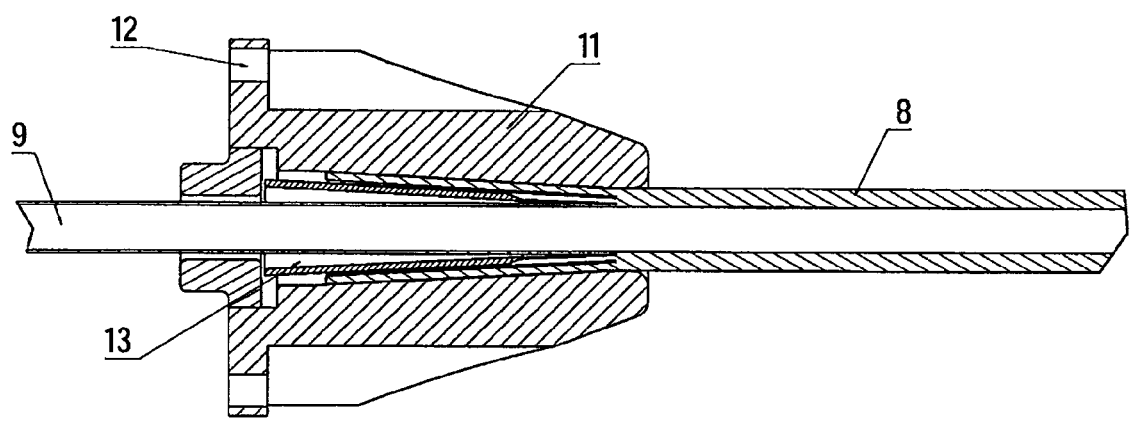
FIG. 5 is a cross sectional elevational view of a coupling for connecting a reinforced cable to the device shown in FIG. 1.

The seismic cable is connected to the device by a coupling device 11 known in the art, as shown in FIG. 5. The coupling device has a relatively narrow bore which cooperated with a conical stopper affixed to the armouring layer. The coupling device is bolted to the other termination interface as shown in FIG. 4.

While the above description and drawings describe a preferred embodiment of the device and seismic cable arrangement, it should be appreciated that alternative arrangements are possible within the scope of the invention. For example, the spring could be substituted with a segmented arrangement allowing a degree of bending while maintaining the circular cross section of the device when subjected to pulling/bending forced. Likewise the wires 4 could be made of a synthetic material rather than steel, such as for example Kevlar® material.

The invention claimed is:

1. A connection device for seismic cables comprising
   an elongated, cylindrical body having a first and second ends, and
   a termination interface member attached to each end of the elongated cylindrical body, wherein the elongated, cylindrical body further comprises
   a flexible, cylindrical substrate member extending between the termination interfaces, and
   a plurality of elongated tension members helically wound about the exterior of the flexible substrate member, the ends of the tension members being attached to respective termination interface members.

2. A device according to claim 1 wherein the elongated tension members are wires.

3. A device according to claim 2 wherein the flexible, cylindrical substrate member is a helically wound spring.

4. A device according to claim 3, wherein the spring is arranged abutting the termination interface members in a partially-compressed state.

5. A device according to claim 4 wherein the wires are woven with a portion of the wires wound in the clockwise direction and a portion of the wires wound in the counter clockwise direction.

6. A device according to claim 5, wherein the wires make at least one complete turn around the circumference of the spring.

7. A device according to claim 6, wherein the spring and wires are moulded into an outer casing of a flexible, resilient material.

8. A device according to claim 7, wherein the resilient material is vulcanized rubber.

9. A device according to claim 8, wherein the termination interface member has a cylindrical bore, and the wires are attached to the termination member by being wedged against the inner face of the bore by a wedge member.

10. A seismic cable arrangement comprising
    a. At least one device according to either of claims 1-9, connected at its first end to a sensor module
    b. A coupling member attached to the second end of the device, said coupling member arranged to securely engage a wire-armoured outer layer of a seismic cable, said seismic cable having an internal, signal-carry cable,
    c. A seismic cable connected to the coupling, with an exposed portion of signal-carry cable arranged in the interior of the device, said signal carrying cable being connected to the sensor module.

11. A seismic cable arrangement according to claim 10 wherein a pair of devices are connected to the sensor module, and a plurality of such pairs are arranged in series.

12. A seismic cable arrangement according to claim 11, wherein the arrangement is adapted to be wound about a drum winch on a deployment vessel.

13. A method of manufacturing a connecting device for cables, comprising the steps of:
    a. Providing a helically wound compression spring,
    b. Partially compressing the spring in a press,
    c. Weaving a plurality of wires in a helical arrangement about the exterior of the spring,
    d. Connecting the ends of the wires to termination interface members, and
    e. Releasing the spring from the press, such that the expansion force of the spring causes any stack from the wound wires to be reduced.

14. A method according to claim 13, further comprising the step of moulding a resilient, flexible material about the spring and the wires.

* * * * *